Oct. 20, 1936.                    D. PAXTON                    2,057,968
                                TESTING MACHINE
                              Filed May 13, 1933            6 Sheets-Sheet 1

Inventor
Dewey Paxton
By Clarence A. O'Brien
Attorney

Oct. 20, 1936.　　　D. PAXTON　　　2,057,968
TESTING MACHINE
Filed May 13, 1933　　　6 Sheets-Sheet 2

Inventor
Dewey Paxton
By Clarence A. O'Brien
Attorney

Oct. 20, 1936.  D. PAXTON  2,057,968
TESTING MACHINE
Filed May 13, 1933  6 Sheets-Sheet 3

Inventor
Dewey Paxton
By Clarence A. O'Brien
Attorney

Oct. 20, 1936.  D. PAXTON  2,057,968
TESTING MACHINE
Filed May 13, 1933  6 Sheets-Sheet 4

Inventor
Dewey Paxton
By Clarence A. O'Brien
Attorney

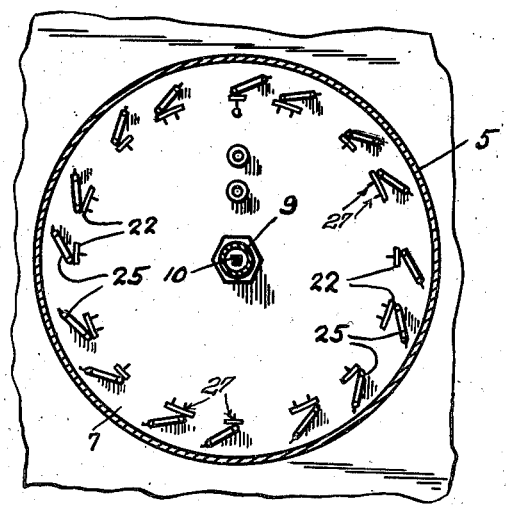
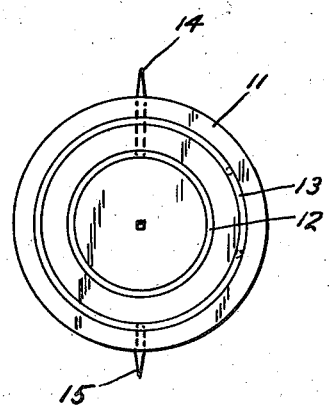
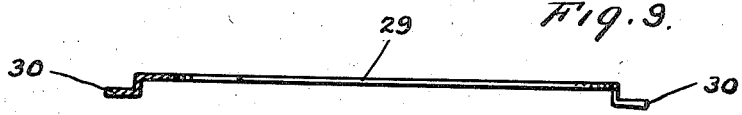
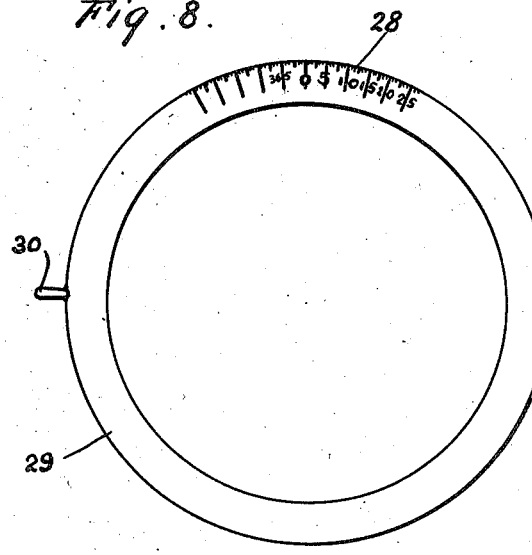
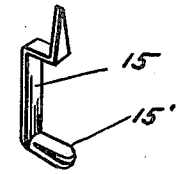
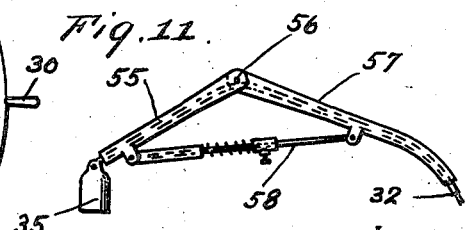

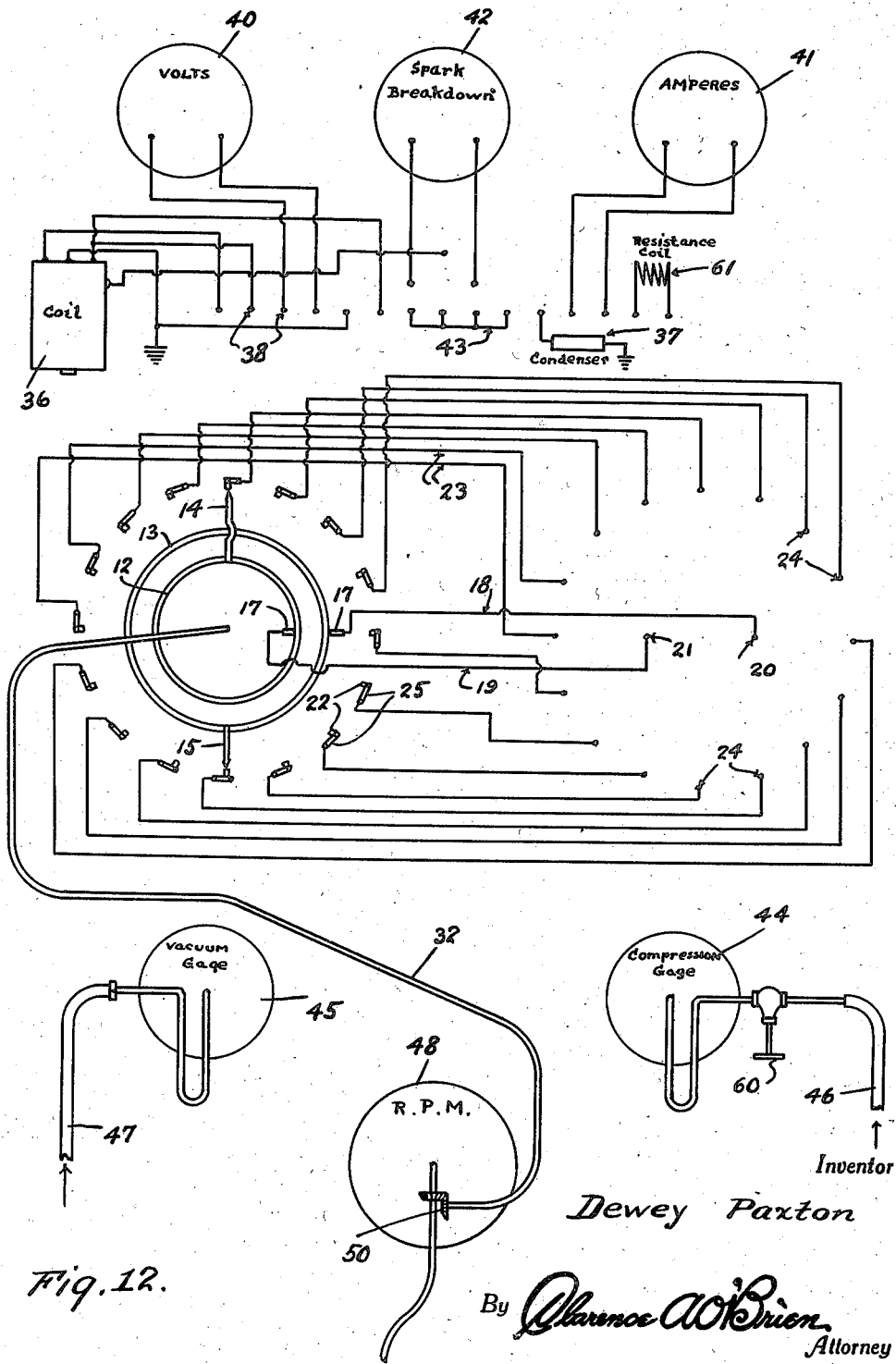

Patented Oct. 20, 1936

2,057,968

UNITED STATES PATENT OFFICE 2,057,968

TESTING MACHINE

Dewey Paxton, Trinidad, Colo., assignor to Edward Rosslyn, Los Angeles, Calif.

Application May 13, 1933, Serial No. 670,990

3 Claims. (Cl. 177—311)

This invention relates to a testing machine which is mainly designed for motor vehicles and the like and which, of course, can be used for other apparatus.

The general object of the invention is to provide means for diagnosing improper functioning of engine parts including starting, lighting and ignition systems and the like, and to provide means for testing various parts of different kinds of apparatus.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 6 is a front view, with parts removed, showing the neon tubes and the contacts to which they are connected.

Figure 7 is a view of the rotary disk.

Figure 8 is a view of the adjustable and graduated ring.

Figure 9 is an edge view partly in section of said ring.

Figure 10 is a view of one of the pointers of the rotary disk.

Figure 11 is a view of the flexible drive shaft.

Figure 12 is a diagrammatic view of the circuits and other parts of the invention.

Figure 1:
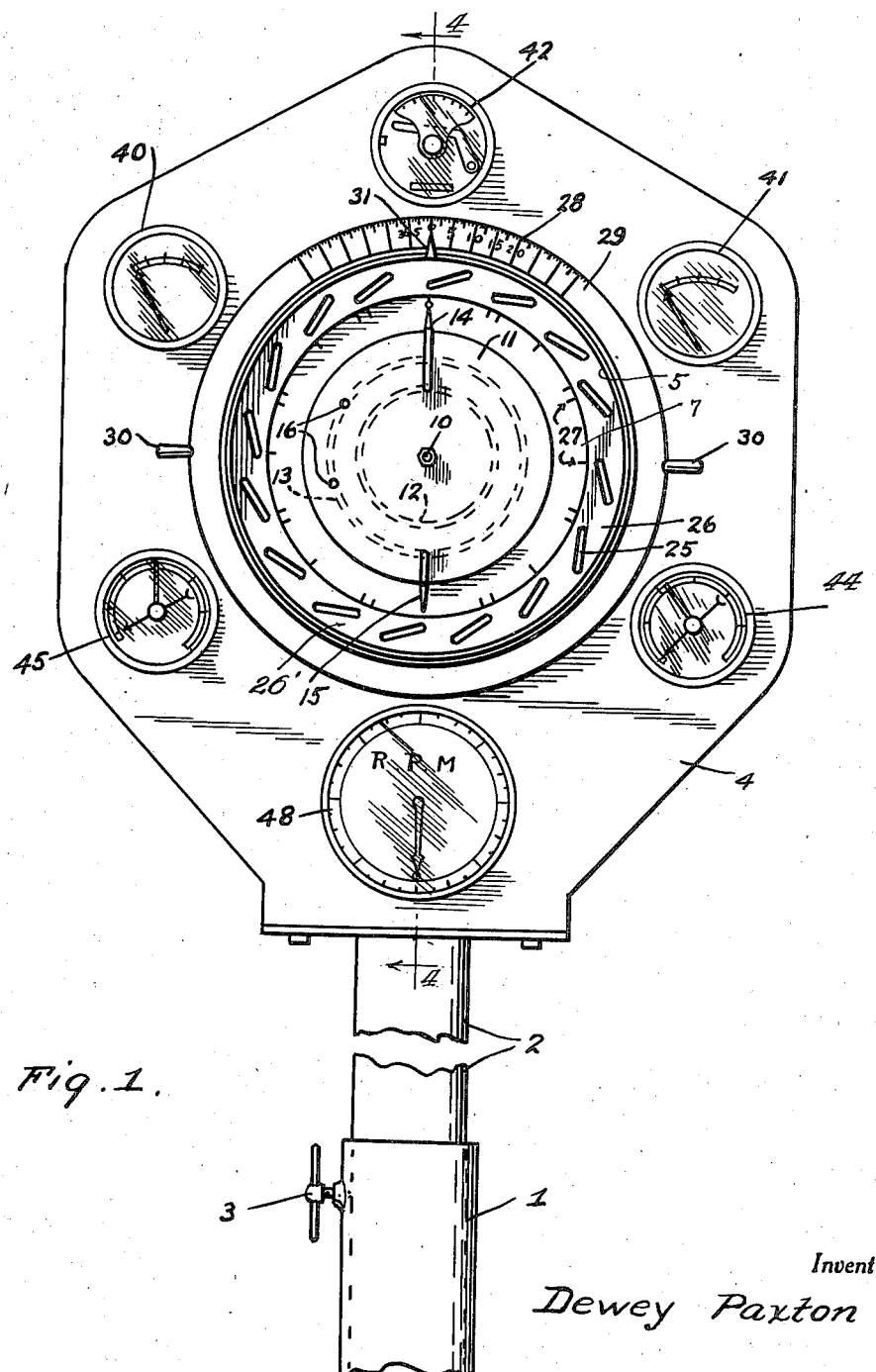
Figure 1 is a front view of the device.
Figure 2:
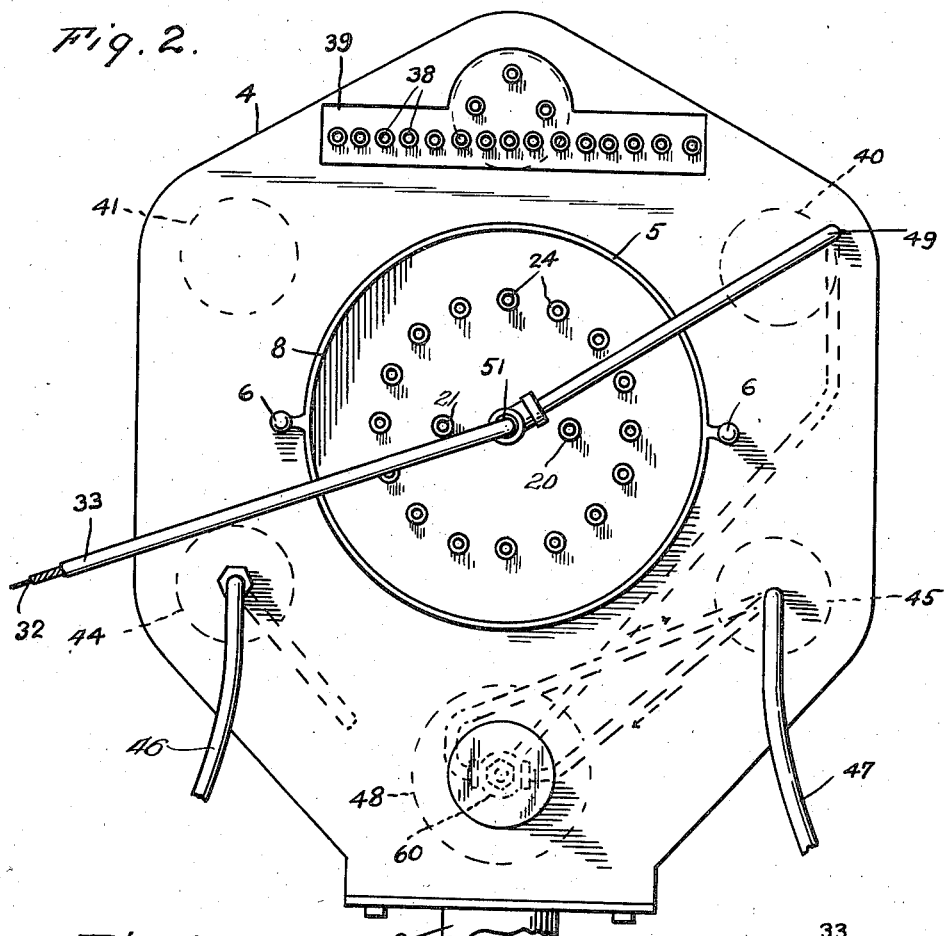
Figure 2 is a rear view thereof.
Figure 3:
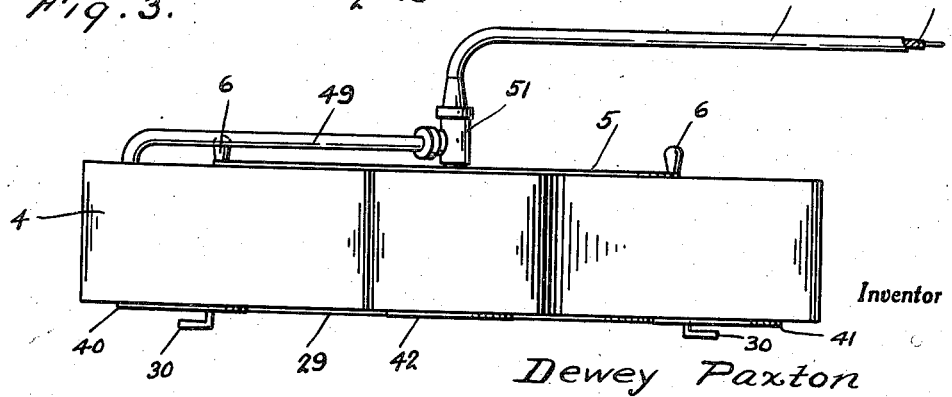
Figure 3 is a top plan view.

In these drawings, the numeral 1 indicates a hollow standard attached to a suitable base and the numeral 2 indicates a member slidably arranged in the standard and held in adjusted position therein by the adjusting bolt 3. A casing 4 has its lower part attached to the upper end of the member 2 and this casing carries the various parts of the invention.

Figure 4:
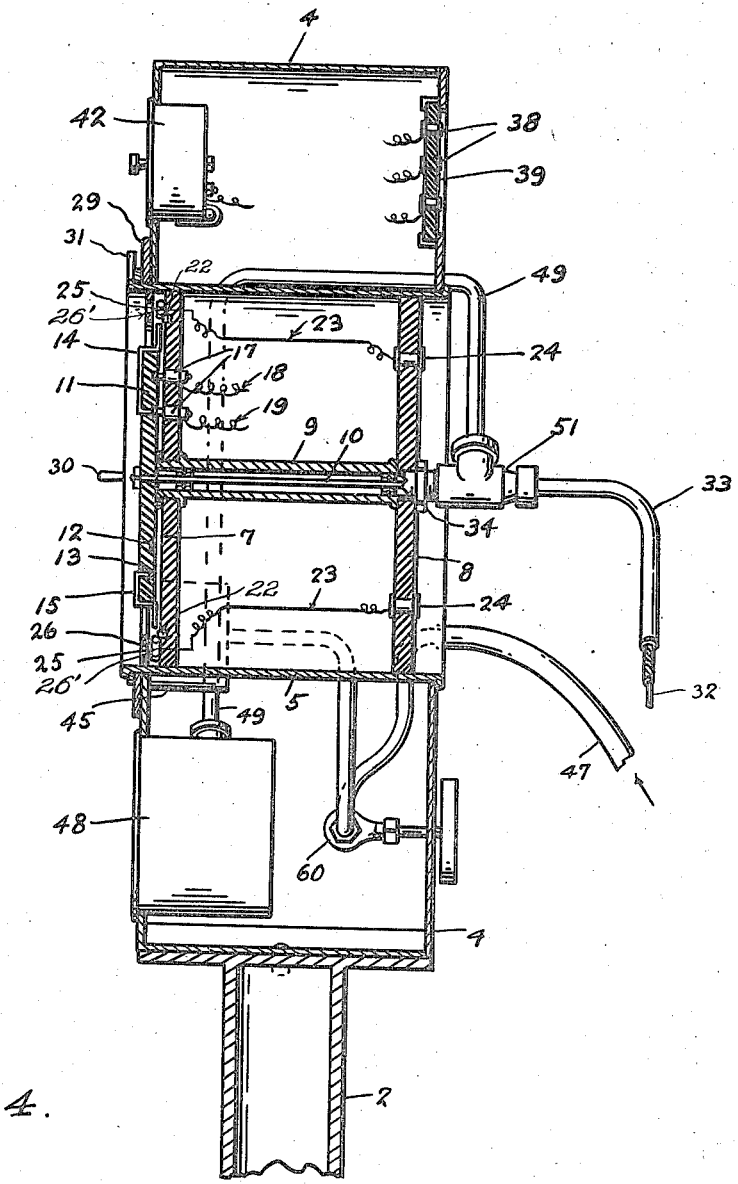
Figure 4 is a vertical sectional view through Figure 1, the section being taken on line 4—4 of Figure 1.
Figure 5:
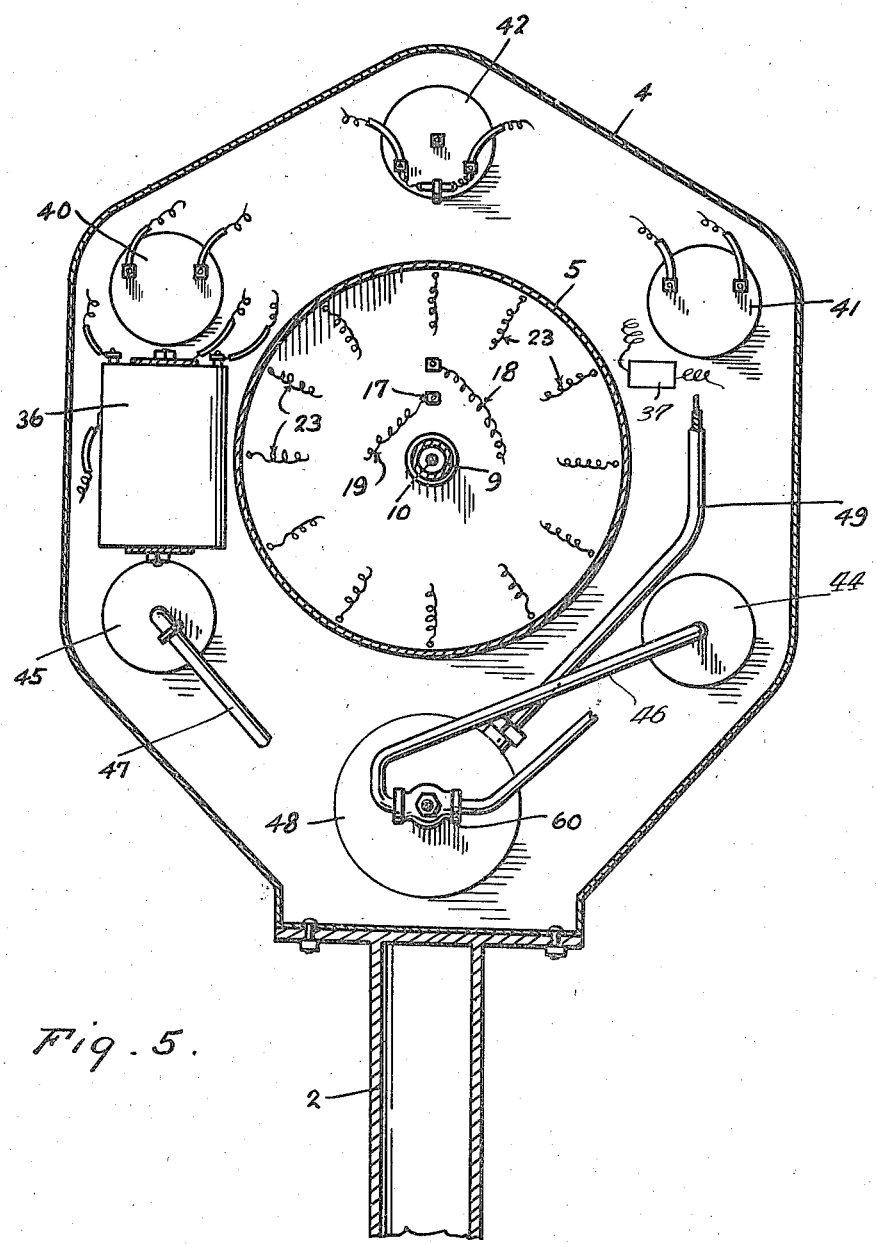
Figure 5 is a vertical sectional view through Figure 4.

A horizontally arranged cylinder 5 passes through the casing from front to rear and is rotatably supported in the front and rear walls of the casing and can be rotated by the handles 6 attached to its rear end. A front disk 7 of non-conducting material, is located in the front part of the cylinder and closes the same and a similar disk 8 is located in and closes the rear part of the casing. A tubular member 9 has its ends connected with the disks and a shaft 10 passes through the tubular member and has fastened to its front end, in front of the front disk 7, a rotary disk 11 which has on its inner face the inner conducting ring 12 and the outer conducting ring 13. A pointer 14 is carried by the disk 11 and has one end passing through a part of the disk and in contact with the inner ring 12, as shown in Figures 4 and 7 and a second pointer 15 is adapted to be placed on the disk 11 with a projection 15' see Figure 10 thereon passing through any one of a number of holes 16 in the disk to contact the outer ring 13. A pair of brushes 17 is carried by the disk 7 and one brush contacts the ring 12 and the other the ring 13 and conductors 18 and 19 are connected with these brushes and pass through the cylinder to the plugs 20 and 21 carried by the rear disk 8 and adapted to receive the electrical connections, as will be hereinafter described.

An annular row of short strips 22 is placed in the front disk 7 adjacent the periphery thereof, and conductors 23 are electrically connected with these strips by neon tubes 25, as hereinafter explained, and these conductors pass through the cylinder to the plugs 24 arranged in an annular row in the rear disk 8 and these plugs are also adapted to receive electrical connections, as will be hereinafter described. These strips 22 are slightly spaced from the pointed ends of the pointers 14 and 15 so that current will jump from the pointer to a strip when the pointer is adjacent said strip. A neon tube 25 is associated with each strip 22 and has one terminal electrically connected to the strip and its other terminal electrically connected to a conductor 23, as shown in Figure 12 and when current is passing through these tubes they will glow in the usual manner and thus act in conjunction with the jump sparks passing from the pointer 14 to the strips 22 to show that current is passing through the electrical connections to the spark plugs and these tubes also act to indicate the condition of the spark plugs as will be hereinafter described. A ring-shaped strip 26 covers that part of the disk 7 which carries the strips 22 and has openings 26' therein for exposing the neon tubes. The disk 7 has twenty-four indicating marks 27 thereon and these marks are arranged to extend inwardly from the sixteen collecting strips 22. The ring 29 surrounds the front end of the cylinder and is rotatably supported on the front of the casing and may be adjusted by means of the handles 30. As will be seen, this ring is calibrated to 360°. The topmost mark 27 has the zero character directly under it, as shown in Figures 1 and 6, as this indicating mark is the beginning one in testing the number 1 cylinder of a motor, regardless of how many cylinders the motor being tested has. These lines or marks 27 are so arranged that they may be used in testing motors having four, six, eight, twelve and sixteen cylinders. For instance, a six cylinder motor fires 60° apart, which completes a circle of 360°. In the annular row of lines or marks 27, there are six lines or marks spaced 60° apart so that these six marks or lines will be used in testing the six-cylinder motor. A twelve cylinder motor fires 30° apart and with this motor, the lines or marks 27 spaced 30° apart will be used in testing a twelve cylinder motor. Thus the lines or marks 27 are so arranged that they can be used in testing motors having four, six, eight, twelve and sixteen cylinders. As will be seen, the copper strips 22 pass over these lines or marks 27 and extend on both sides so that a spark, if not correctly spaced, can fire off the lines or marks 27, which proves the spark is not taking place at the proper point in the movement of the cylinder piston.

The front of the cylinder carries a pointer 31 which extends over the ring 29.

A flexible shaft 32, enclosed in a flexible casing 33, is connected by a coupling 34 with the rear end of the shaft 10 and this shaft 32 is connected with the distributor shaft by a coupling 35 so that shaft 10 will be driven from the timer shaft which, of course, results in the rotation of the wheel or disk 11. It will, of course, be understood that the cap and rotor arm of the timer or distributor must be removed before the shaft 32 can be connected to the distributor shaft.

This part of the invention operates as follows:

The spark plug wires are plugged in the socketed plugs 24 so that the plugs are electrically connected to the collector strips 22 and the neon tubes or lamps 25, if such lamps are used. Then a wire, connected with the motor coil, is plugged in the socket 21 so that the coil is electrically connected to the ring 12 at the front of the cylinder. It will, of course, be understood that the spark plug wires should be connected with the apparatus in their firing order. The motor is cranked to the dead center position of No. 1 cylinder piston and then the cylinder 5 is rotated to bring the zero mark 27 under the finger 14 of wheel or disk 11, which, of course, has been moved by the distributor shaft of the motor when the motor was cranked. Then the ring dial 29 is adjusted until its zero mark is under the finger 31 of the cylinder 5. This position of the parts is shown in Figure 1, and this position of the parts is the starting point of the testing operation with the No. 1 piston of the motor at dead center. The motor is then started and if the distributor of the motor is correctly timed to fire at dead center, a spark will appear on the zero line 27 as current will flow from the coil through the conductor 19 to the inner ring 12 of the wheel 11 and then pass through the finger or pointer 14 and jump to the strip 22 over the zero line 27 and then pass over a conductor 23 to a plug or socket 24 and then to the spark plug. However, if the motor distributor was not correctly timed, the spark would not pass to the strip 22 over the zero line 27 and thus the operator would know that the No. 1 cylinder was not firing at the proper time. The operator then adjusts cylinder 5 so that the spark will pass over the zero line 27 and this adjustment of the cylinder 5 would move the pointer 31 away from the zero line of the scale 28 on the ring 29 and thus the operator can ascertain in degrees, from the scale 28, just how much No. 1 cylinder is firing off dead center position of No. 1 piston and this enables him to adjust the distributor to the correct degree.

The scale 28 of the ring 29 always indicates the dead center position in operation and enables one to adjust the distributor of the motor in degrees while the motor is running and this ring carrying scale is not moved after being once adjusted at the starting of the testing operation. The wheel or disk 11 is always in relation to the dead center position of No. 1 piston of the motor, while the cylinder 5 is adjusted around the wheel or disk to place the sparks on the lines 27 and its finger 31 indicates on the scale 28 in degrees the amount of adjustment the sparks are off the lines 27 and the amount of adjustment necessary to be made in the distributor of the motor.

If the motor being tested is to fire 10° before dead center, for instance, the cylinder 5 would be adjusted in a reverse direction of travel of the distributor wheel 11, to the 10° mark on the scale 28 and then the motor would be started. If the spark did not appear on the line 27, the distributor of the motor must be adjusted, while the motor is running, to where the spark will appear on the 10° mark 27, as indicated by the scale, and then the cylinders would be firing 10° before the pistons reach dead center.

Thus this device will indicate whether or not the cylinders of a motor are firing on dead center of the pistons of the motor and if not, by adjusting the cylinder 5 the operator can ascertain in degrees from the scale 28 the points at which the cylinders are firing before or after the pistons reach dead center and this enables the operator to adjust the distributor of the motor to the exact degree necessary to have the cylinders fire at the proper time. The device also enables the operator to adjust the distributor of the motor to the correct degree when he wishes the motor to fire a certain number of degrees before the pistons reach dead center or after they pass dead center.

When the neon tubes are used, they are connected with the strips 22 and the wires 23 in the usual manner and when the spark jumps from the pointer carried by the wheel 11 to a strip 22, the tube will glow and show that current has passed through the electrical connection to the spark plug. If the spark plug is foul, the glow in the neon tube will be weak and in case the spark plug is so foul as to ground the current, the tube would show no life and thus the operator would know that the spark plug must be replaced by a new one.

This device eliminates all guess work in checking ignition troubles and timing. It also measures in degrees the wear of lobes on the distributor shaft and wear in the distributor shaft bushing. It also checks operation of automatic and manual spark advance by the method of measuring, as before described. By adjusting the distributor of the motor, the amount of advance or retard spark is calibrated by adjusting the cylinder 5 so that the spark will appear over a line 27 and measurement of the movement of the cylinder 5 to cause the spark to pass over a line 27 is made on the scale 28.

When using an extremely sensitive tachometer, driven by the motor distributor shaft, an operator can determine instantaneously the speeds or changes of speed in a motor being tested and thereby check the motor automatic spark advance in degrees on the tester, while the motor runs at various speeds and both the automatic and manual spark control can be so checked.

If the motor is operating with two coils, the second coil is connected with the apparatus by plugging the wire from said second coil in the socket or plug 20 so that the current from the second coil will pass to the outer ring 13 and then through the pointer 15 and as will be seen in Figure 1, this pointer 15 can be placed in any one of the holes 16 in the wheel or disk 11.

A coil 36 is supported in the casing and a condenser 37 is also arranged in the casing and these members are connected by suitable wiring to some of the socket plugs 38 carried by a member 39 at the top of the rear part of the casing and this coil and condenser may be used for comparing and checking the coil of the engine.

The casing also carries a volt meter 40, and ammeter 41 and a spark break-down 42, the wires of which are also connected to some of the plugs 38 so that these devices can be easily used in testing electric appliances by plugging in the wires of said appliances in the plugs 38. Four of the plugs 38 are wired together, as shown at 43, so that the various wires can be electrically connected to the different instruments or devices.

This spark break-down 42 has an adjustable spark gap therein and is provided with a scale for indicating the number of pounds of pressure in the device under which the spark will jump the gap under various adjustments of the gap. This spark gap is connected with the secondary circuit of a motor and by adjusting the gap while the motor is running, the scale reading in pounds of compression is obtained as the gap is widened and this scale reading will indicate the pressure under which the spark plug will fire. For instance, suppose the spark plug would fire under 70 lbs. pressure. The spark break-down scale would calibrate 70 lbs. and the sparks would flow steadily between the gap points of the spark break-down as the motor operates. If the motor did not run smoothly, the condenser 37 would be connected to the circuit, but if the use of this condenser increased the efficiency of the sparks through the gap, this would show that the condenser on the motor was insufficient, but if the use of the condenser 37 did not increase the spark flow between the gap of the device 42, then it would show that the condenser on the motor was in good working order. This method is simply a comparative condenser test. Then the coil 36 would be connected to the electrical connection to the device 42 and if this raised the efficiency of the coil past 70 lbs. it would prove that the coil on the motor being tested was insufficient to operate the motor efficiently.

The casing also carries a compression gauge 44 and a vacuum gauge 45 and tubes 46 and 47 lead from these gauges through the casing so that they can be connected to the instrument to be tested by said gauges.

The casing also carries a tachometer 48, the shaft of which is connected by a flexible shaft arranged in a flexible casing, as shown generally at 49, with the shaft geared to the flexible shaft 32, as shown at 50 in Figure 12, the gears being enclosed in a housing 51, as shown in Figure 4.

The coupling 35 for connecting the flexible shaft 32 with the distributor shaft is arranged at one end of an arm 55 which is pivoted as at 56 to a second arm 57 and the flexible shaft and its casing passes through these arms, as shown more clearly in Figure 11. The two arms are adjustably connected together by an adjustable and telescopic brace 58.

That part of the device which includes the cylinder 5 and its associated parts can be utilized as a permanent distributor on the instrument boards of motor vehicles and combustion motors of various kinds which use distributor methods of sending electric currents to the spark plugs or firing units. As will be seen, this device enables the spark to be readily seen and gives perfect reading of synchronization and the amounts in degrees the spark is occurring before and after dead center of piston stroke, the amount in degrees the automatic advance advances and also the manual advance.

A valve 60 controls the flow of fluid through the tubes 46 and 47 and a resistance coil 61 is located in the casing as shown in Figure 12.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A testing device of the class described comprising a supporting member, a graduated ring, means for rotatably supporting the ring on one face of the supporting member, a rotary member, means for rotatably supporting said member from the supporting member with a part of the member encircled by the ring, a pointer on the rotary member extending over the ring for indicating the amount of movement of the rotary member relative to the ring, an annular row of contact strips carried by the rotary member, said rotary member having marks thereon adjacent the strips, means for electrically connecting each contact strip to separate spark plugs of an internal combustion engine, said rotary member having an indicating mark thereon located adjacent one of the first mentioned marks, a shaft, means for rotatably supporting the same in the central portion of the rotary member with one end projecting from the rotary member, a disk of non-conducting material connected with said projecting end of the shaft, means for mechanically connecting the shaft with the distributor shaft of the engine, a pointer of conducting material carried by the disk and having its outer end spaced from the contact strips to provide a spark gap between itself and the strips during the rotary movement of the disk, means, including brush means carried by the rotary member and the disk, for electrically connecting the pointer with the ignition coil of the engine, and means whereby the graduated ring and the rotary member can be manually rotated.

2. A testing device of the class described comprising a supporting member having a circular opening therein extending from one face of the supporting member through the other face, a cylinder rotatably mounted in the opening and having one end projecting therefrom, means whereby the cylinder can be manually rotated, a graduated ring surrounding the projecting end of the cylinder, means for rotatably supporting the ring from the supporting member, a pointer carried by the projecting end of the cylinder and extending over the ring, an end member in the cylinder, an annular row of contact strips carried by the end member, means for electrically connecting each of the contact strips to separate spark plugs of an internal combustion engine, said end member having an annular row of indicating marks thereon extending inwardly from the contact strips, a shaft passing through the central part of the cylinder, mechanical means for connecting the shaft to the distributor shaft of the engine, one end of the shaft projecting beyond the end member of the cylinder, a disk of nonconducting material connected with the projecting end of the shaft and of less diameter than the diameter of the end member, a pointer of conducting material carried by the disk and having its outer end spaced from the strips to provide a spark gap between itself and the strips during the rotary movement of the disk, a ring of conducting material carried by the disk and contacting the pointer carried by the disk, a brush carried by the end member and contacting the ring, and a conductor connecting the brush with the ignition coil of the engine.

3. A testing device of the class described, comprising a supporting member, a cylindrical member, means for rotatably supporting the cylindrical member by the supporting member, said cylindrical member having an outer insulated face, an annular row of spaced contact strips on said face, means for electrically connecting each of the contact strips to one of the spark plugs of an engine to be tested, said face also having index marks, thereon adjacent the contact strips to indicate the proper firing position, a pointer, means for rotating the pointer over said face from the distributor shaft of the engine under test and means for connecting the pointer to the ignition coil of the engine, and a graduated ring surrounding the outer end of the cylindrical member, means rotatably supporting the ring from the supporting member, a pointer on the cylindrical member cooperative with the graduated ring and means whereby the ring can be manually rotated.

DEWEY PAXTON.